United States Patent
Scholtz et al.

(10) Patent No.: US 6,301,337 B1
(45) Date of Patent: Oct. 9, 2001

(54) COMBINED HANDSET AND POTS FILTER

(75) Inventors: William H. Scholtz, Middletown; Arnold Muralt, Fair Haven, both of NJ (US)

(73) Assignee: Globespan, Inc., Red Bank, NJ (US)

( * ) Notice: Subject to any disclaimer, the term of this patent is extended or adjusted under 35 U.S.C. 154(b) by 0 days.

(21) Appl. No.: 08/932,899

(22) Filed: Sep. 18, 1997

(51) Int. Cl.[7] .............. H04M 1/24; H04M 3/22
(52) U.S. Cl. ............ 379/30; 379/27; 379/93.06
(58) Field of Search ............... 379/1, 5, 6, 12, 379/21, 22, 23–30, 93.09, 164, 370, 377, 93.05, 93.06, 93.07, 90.01, 110.01, 387, 399

(56) References Cited

U.S. PATENT DOCUMENTS

| | | | |
|---|---|---|---|
| 4,422,047 | * 12/1983 | Wright | 330/51 |
| 4,777,645 | * 10/1988 | Faith et al. | 379/27 |
| 5,014,299 | * 5/1991 | Klupt et al. | 379/165 |
| 5,163,050 | * 11/1992 | Cromack | 379/339 |
| 5,173,934 | * 12/1992 | Marquet et al. | 379/93.06 |
| 5,271,060 | * 12/1993 | Moran, III et al. | 379/403 |
| 5,432,705 | * 7/1995 | Severt et al. | 379/27 |
| 5,703,928 | * 12/1997 | Galloway et al. | 379/27 |
| 5,805,669 | * 9/1998 | Bingel et al. | 379/28 |
| 5,841,841 | * 11/1998 | Dodds et al. | 379/90.01 |
| 5,848,150 | * 12/1998 | Bingel | 379/399 |
| 5,929,896 | * 7/1999 | Goodman et al. | 379/90.01 |
| 5,930,340 | * 7/1999 | Bell | 379/93.08 |
| 5,956,385 | * 9/1999 | Soto et al. | 379/27 |
| 6,014,425 | * 11/2000 | Bingel et al. | 379/27 |
| 6,014,571 | * 1/2000 | Enoki | 455/550 |
| 6,061,392 | * 5/2000 | Bremer et al. | 375/222 |
| 6,078,660 | * 6/2000 | Burgess | 379/386 |

FOREIGN PATENT DOCUMENTS

| | | | |
|---|---|---|---|
| 11284773A | * 10/1999 | (JP) | 379/93.06 |

* cited by examiner

Primary Examiner—Curtis Kuntz
Assistant Examiner—Rexford Barnie
(74) Attorney, Agent, or Firm—Thomas, Kayden, Horstemeyer & Risley

(57) ABSTRACT

The present invention is generally directed to a telephone handset for testing the transmission quality of a local loop. In accordance with one aspect of the invention, the telephone handset includes a connector configured to connect to the local loop at, for example, a junction box. The invention also includes a low-pass filter circuit electrically interposed between the connector and operational circuitry of the telephone handset. In operation, the low-pass filter is designed to pass (substantially undisturbed) electrical signals within the POTS frequency band from the connector to the operational circuitry. In the same way, the low-pass filter is designed to substantially block the passage of electrical signals above the POTS frequency range. In this way, the low-pass filter blocks the introduction of high frequency signals, which may otherwise generate intermodulation products within the audible range, from reaching the operational circuitry of the testing handset. In accordance with another feature of one embodiment of the invention, a device is provided for detecting the presence of xDSL signals on a local loop. In accordance with this embodiment, at least one band-pass or high-pass filter is added in parallel with the low-pass filter. The output of the at least one band-pass or high-pass filter is then analyzed to determine whether an xDSL signal is present within that frequency band (defined by the at least one band-pass or high-pass filter).

3 Claims, 6 Drawing Sheets

COMBINED HANDSET AND POTS FILTER

BACKGROUND OF THE INVENTION

1. Field of the Invention

The present invention generally relates to telephone handsets, and more particularly to an improved telephone handset for use in testing lines carrying both POTS and xDSL communications.

2. Discussion of the Related Art

In recent years telephone communication systems have expanded from traditional plain old telephone system (POTS) communications to include high-speed data communications as well. As is known, POTS communications includes not only the transmission of voice information, but also PSTN (public switched telephone network) modem information, control signals, and other information that is transmitted in the POTS bandwidth, which extends from approximately DC to approximately 3.4 kilohertz.

New, high-speed data communications provided over digital subscriber lines, such as Asymmetric Digital Subscriber Line (ADSL), Rate Adaptive Digital Subscriber Line (RADSL), etc. (more broadly denoted as xDSL) provide for high speed data transmissions, as is commonly used in communicating over the Internet. As is known, the bandwidth for xDSL transmissions is generally defined by a lower cutoff frequency of approximately 30 kilohertz, and a higher cutoff frequency which varies depending upon the particular technology. Since the POTS and xDSL signals are defined by isolated frequency bands, both signals may be transmitted over the same two-wire loop.

A POTS splitter is typically provided at each end of a transmission system communicating both POTS and xDSL information. As is known, a POTS splitter circuit consists of a high-pass filter and a low-pass filter, which are used to separate the two signals (the POTS signal from the xDSL signal). Normally, the high-pass filter is built into the xDSL transceiver, whereas the low-pass filter (commonly referred to as a POTS filter) normally provided as a separate unit. In operation, the POTS filter operates to filter the high frequency xDSL signals in order to protect the POTS (e.g., telephone) circuitry. At the same time the POTS filter provides filtering and protection for higher frequency noise signals that are often associated with a ring signal, or the switching circuitry of a central office.

It has been found, however, that troubleshooting line problems on local loops carrying both POTS and xDSL communications is frequently more difficult than troubleshooting a POTS only local loop. Years ago, the service provider (phone company) installed telephone lines from the central office, all the way to the telephone. Thus, the service provider was responsible for the integrity of the line all the way to the termination point (at the telephone). However, in recent years, it has become the custom for the service provider to run the local loop only to a junction box at the customer premises (whether the customer premises is a business, personal residence, etc.). Therefore, when performing testing on the local loop, the service provider is responsible only for insuring the integrity of the local loop between the central office and the junction box at the customer premises.

Typically, testing of a line is performed by a service technician using a testing handset to test the line. Alternatively, testing may be performed using more elaborate and specialized test equipment such as a transmission impairment measurement system (TIMS). The technician will plug the testing handset into a junction of the line to test the quality of the communications at that junction, and thus verifying the integrity of the line between the junction and the central office. Usually, the junction tested is the junction provided at the customer premises. In short, this form of testing is performed "by ear", wherein the field technician evaluates the line quality by listening to the quality of the sound/signal at the testing handset.

It has been found that a problem in this manner of testing often arises when there are shared communications on the same local loop. For example, when the customer not only has POTS service, but also subscribes to an xDSL service, technicians testing the line quality often detect noise signals within the POTS frequency band, when testing the line at the junction box, which noise signals are not audibly present on POTS telephones inside the customer premises.

Accordingly, it is desired to provide an improved method or apparatus for testing local loops that overcomes the shortcomings and disadvantages noted above.

SUMMARY OF THE INVENTION

In researching the shortcomings of the manner of testing line quality and in the testing handsets used in the prior art, it was determined that many of the perceived line problems were actually the result of intermodulation products. Testing handsets, as with other common telephone handsets, include internal circuitry that generates intermodulation products when receiving high frequency signals; the intermodulation product being a signal having a frequency defined by the differential of two higher frequency, received signals. When xDSL communications are occurring at the same time the technician is testing the line, intermodulation products generated by the handset from the high-frequency xDSL transmissions often generate noise in the audible frequency band, which interferes with the proper evaluation of the line test conducted by the technician. Since POTS filters are disposed between the junction box and the POTS telephones at the customer premises (for those customer premises having a xDSL communication service), such intermodulation noise signals are not present at the POTS telephones.

When a field technician is dispatched to test a local loop at a customer premises, the technician does not necessarily know whether that customer premise includes a xDSL service. Even if the service technician is made aware that the customer premises includes an xDSL service, the technician will still not know whether a device within the customer premise is transmitting information within the xDSL frequency band at any given time.

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to a telephone handset for testing the transmission quality of a local loop. In accordance with one aspect of the invention, the telephone handset includes a connector configured to connect to the local loop at, for example, a junction box. The invention also includes a low-pass filter circuit electrically interposed between the connector and operational circuitry of the telephone handset. In operation, the low-pass filter is designed to pass (substantially undisturbed) electrical signals within the POTS frequency band from the connector to the operational circuitry. In the same way, the low-pass filter is designed to substantially block the passage of electrical signals above the POTS frequency range. In this way, the low-pass filter blocks the introduction of high frequency signals, which may otherwise generate intermodulation products within the audible range, from reaching the operational circuitry of the testing handset.

In accordance with the preferred embodiment of the present invention, the low-pass filter circuit is defined by a cutoff frequency ranging from approximately 3.4 kilohertz to approximately 10 kilohertz. In addition, means are further included for bypassing the low-pass filter. Preferably, this "bypass" means includes a manually-operated switch, such as a double-pole, double throw switch. Such a switch allows the service technician to switch the low-pass filter into and out of the circuitry, when desired. Alternatively, the "bypass" means may be automatically implemented. In this regard, circuitry may be provided to sense the presence of high frequency signals (i.e., signals in the xDSL frequency band) that may otherwise generate unwanted intermodulation noise in the audible frequency. Upon sensing such signals, the "bypass" means may be configured to automatically switch in the low-pass filter circuitry.

In will be appreciated that, consistent with the concepts and teachings of the present invention, the low-pass filter may be either an active filter or passive filter. Furthermore, depending upon the intended operating environment, the low-pass filter may be designed to have varying input impedance. For example, in a first operating environment, it may be desirable to design the low-pass filter with in input impedance of approximately 600 ohms, while in another embodiment, it may be desired to design the filter to have an input impedance of approximately 900 ohms.

In accordance with another aspect of the invention, an improved telephone handset for normal POTS communication may be provided. In this regard, the inventive aspects and features summarized above may be incorporated into a typical POTS telephone, along with a mechanism for automatically detecting the presence or transmission of an xDSL signal on the line. In response to such detection, the mechanism is operative to switch in the low-pass POTS filter. In this way, the low-pass filter is utilized only when needed. Such a telephone may be utilized at a customer premises having a xDSL service and a xDSL communication device, and thus eliminate the need for separately install a POTS filter at the customer premises. In this regard, a handset including the "bypass" means feature described above may be mass produced at a reasonably low cost and provided to subscribers of xDSL services, particularly where that service will share a common local loop with POTS communication devices.

In accordance with yet another aspect of an embodiment of the invention, a device is provided for detecting the presence of an xDSL signal on a local loop. In accordance with this aspect, the device includes an input electrically connected to the local loop and a first filter electrically connected to the input for passing signals within a POTS frequency band. A second filter is electrically connected to the input for passing signals having frequency components above the POTS frequency band. Preferably, the second filter will be defined by a high input impedance, so that POTS signals passing through the first filter are substantially undisturbed. A signal detector is electrically connected to an output of the second filter for detecting the presence of a signal having a frequency above the POTS frequency band, and a signaling means is provided for signaling that a signal having a frequency above the POTS frequency band has been detected.

DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENT

Figure 1:
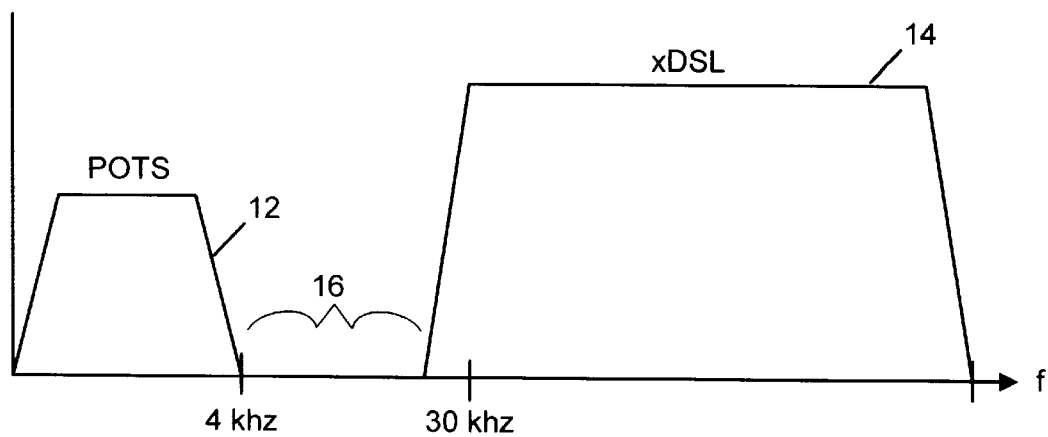
FIG. 1 is graph showing the power spectrum for POTS and xDSL transmission bands.

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

Turning now to the drawings, FIG. 1 is a diagram illustrating frequency band communications, as is known in the prior art. The term frequency band communications is used to indicate communication of information within a certain defined, frequency band. As is known in the prior art, plain old telephone system (POTS) communications are transmitted in the frequency band 12 defined between about 0 (DC) and about 4 kHz. A second transmission frequency band 14 is defined at a higher frequency level than the POTS frequency band 12, and is used in the transmission of digital subscriber line (DSL) communications. A guard dead band 16 is typically provided to separate the two transmission frequency bands 12 and 14. The DSL transmission frequency band 14 is more broadly denominated as "xDSL", wherein the "x" generically denominates any of a number of transmission techniques within the DSL family. For example, ADSL—asynchronous digital subscriber line, RADSL—Rate Adaptive Digital Subscriber Line, HDSL—high-bit-rate DSL, etc. As is known, xDSL transmission frequency bands 14 may encompass a bandwidth of greater than 1 MHz, but the specific upper cutoff frequency will vary depending upon that particular xDSL service. As a result, without the addition of extra equipment such as POTS filters, splitters, etc. xDSL signals are not compatible with attached POTS type equipment, such as telephones, PSTN modems, facsimile machines, etc.

Figure 2:
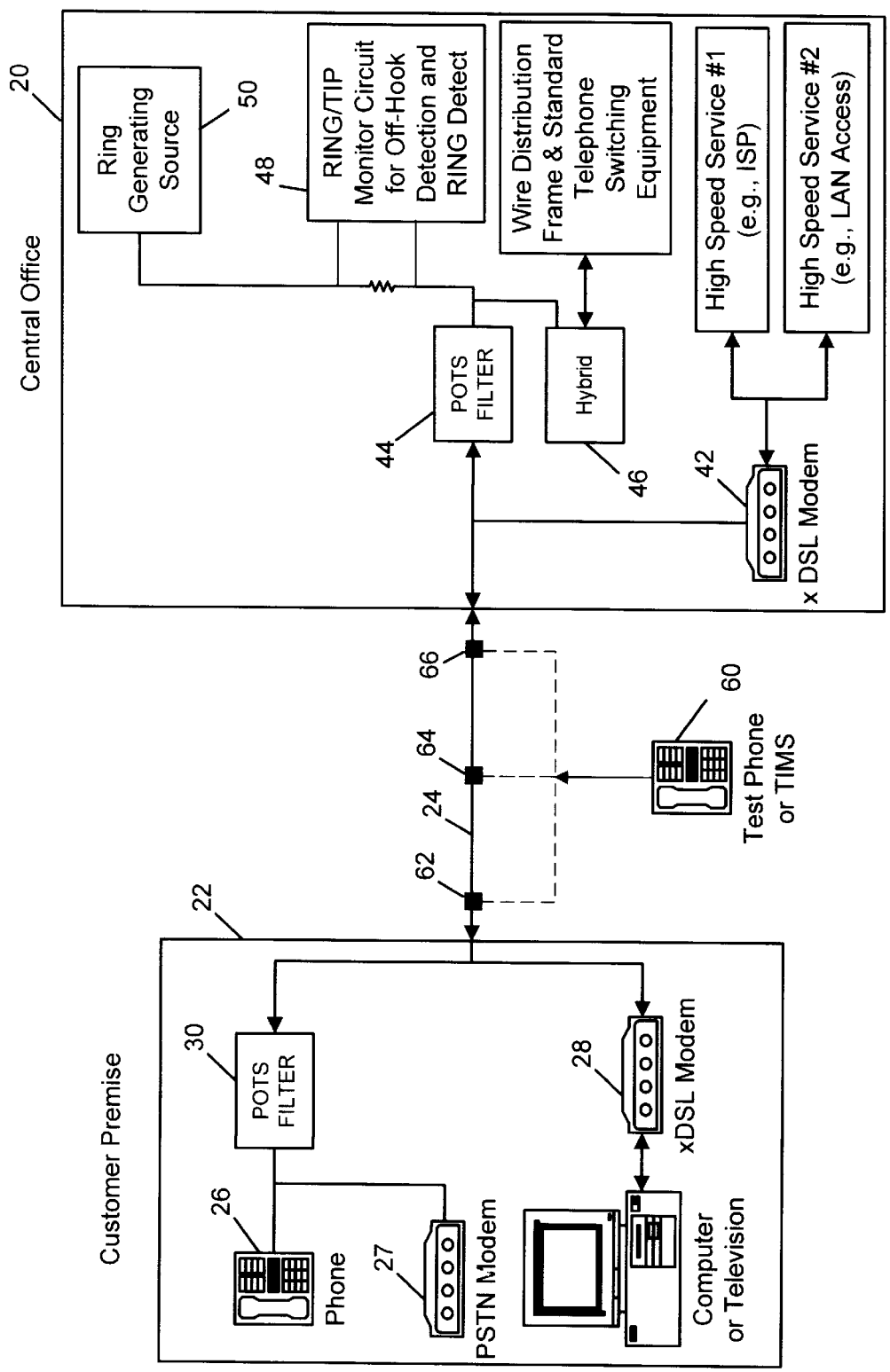
FIG. 2 is a block diagram illustrating the principal components of a prior art telecommunication system, at both the central office and customer premises.

Referring now to FIG. 2, a prior art communication system is shown. Specifically, FIG. 2 illustrates communication between a central office 20 and a customer premises 22 by way of local loop 24. Although FIG. 2 illustrates a central office 20, it will be appreciated that a similar illustration may be used to depict communication between a customer premises 22 and a remote terminal, other than a central office, having substantially the same functionality illustrated in connection with the central office 20. Therefore, FIG. 2 is not intended to limited the environment of the present invention, as described herein.

While the customer premises 22 may be a single dwelling residence, a small business, or other entity, it is generally characterized as having POTS equipment, such as a telephone 26, PSTN modem 27, fax machine (not shown), etc. The customer premise 22 may also include an xDSL communication device, such as an xDSL modem 28. When an xDSL service is provided, a POTS filter 30 is interposed between the POTS equipment 26 and the local loop 24. As is known, the POTS filter 30 includes a low-pass filter having a cut-off frequency of approximately 4 kilohertz to 10 kilohertz, in order to filter high frequency transmissions from the xDSL communication device 28 and protect the POTS equipment.

At the central office 20, additional circuitry is provided. Generally, a line card containing line interface circuitry is provided for electrical connection to the local loop 24. An xDSL modem, including both receiver and transmitter circuitry, is broadly denoted by block 42. This circuitry is directly connected for communications across the local loop 24. The remaining POTS circuitry is separated, or buffered, from the local loop 24 by POTS filter 44. Specifically, other circuitry commonly carried on the line interface card includes a hybrid 46, off-hook detection circuitry 48, and ring generator circuitry 50. Typically, the hybrid circuitry is intermittently connected to the local loop 24 by a switching means (not shown). As is known, a hybrid circuit 46 is a device for translating between two-wire and four-wire communication links. For purposes of illustration, it is important to note that voice and other POTS information is communicated through the block denoted as hybrid circuitry 46 to/from the local loop 24. As is well known, the off-hook detection circuitry 48 is the circuitry utilized at the central office to detect when a user at the customer premises 22 has lifted a telephone handset or otherwise has sought to establish communications from a POTS device.

The ring generation circuitry 50, in a manner that is known, generates a ring signal for communication across the local loop 24, to cause a telephone 26 or other POTS equipment to ring at a customer premises 22. Typically, the ring generation circuitry 50 is disconnected from the local loop 24 by way of a normally open switching means (not shown). To minimize the deleterious effects of various noise signals and to protect the various POTS circuitry, the POTS filter 44 provides low-pass filtering having a cutoff frequency above the approximately 3.4 kilohertz upper frequency band edge.

As is known, and briefly discussed above, there are a variety of reasons in which a person located at a customer premises 22 may experience line problems that manifest themselves as noise on the receiver of a telephone handset 26. The customer may then report the problem to the central office (phone company), which dispatches a field service technician to troubleshoot and isolate the problem. In this regard, the field service technician typically utilizes a test phone 60, known to be in good working order, and may check the local loop 24 by connecting the test phone 60 to any of a number of junction boxes 62, 64, and 66. These junctions may be located at or near the central office 20 (e.g., junction 66), at or near the customer premises 22 (e.g., junction 62), or at intermediate locations (e.g., junction 64). The field service technician connects the test phone 60 to the local loop 24 at the test junction 62, 64, 66, then listens to the handset to determine any "perceived" noise or poor signal quality on the line. Although the illustrated embodiment is described herein in connection with a test phone 60, it will be appreciated that the concepts and teachings of the present invention apply equally to other types of testing devices, such as a TIMS. Accordingly, the invention and inventive concepts are not to be unduly limited to the test phone embodiment discussed herein.

A problem, however, is encountered when higher frequency transmissions, such as xDSL data transmissions, are being communicated across the local loop 24. Since the field service technician is often unaware that the customer may have an xDSL service or, even if he or she knows that the customer premises is equipped with an xDSL service, whether xDSL transmissions are current underway, a field service technician does not know whether/when to discount certain noise signals.

As described previously, such higher frequency xDSL transmissions interact with operational circuitry of the test phone 60 to generate intermodulation products in the form of lower frequency noise signals, often within the POTS (i.e., audible) frequency band. In fact, since the customer premises 22 is typically configured with a POTS filter 30, the noise observed by the field service technician is usually not present on the customer premises telephone 26, therefore making problem verification and isolation even more difficult for the field service technician.

Figure 3A:
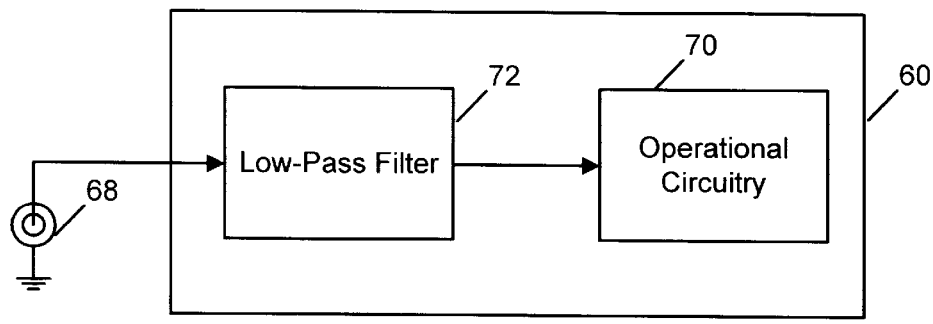
FIGS. 3A–3C are block diagrams illustrating alternative embodiments of the present invention.

In order to avoid this and other shortcomings of the prior art, the preferred embodiment of the present invention is directed to an improved telephone test handset for use by field service technicians in troubleshooting reported line problems of a local loop 24. Referring to FIG. 3A, a first embodiment of the present invention is illustrated. In this embodiment, the test telephone 60 used by a field service technician includes an input lead terminated at a connector 68, which connector may be plugged directly into a jack provided at a junction box. For example, the connector 68 may be in a form of a standard RJ-11 plug. As is known, the telephone 60 includes operational circuitry 70 which provides for the functional aspects of the telephone. Since the various operational circuitry and functional aspects of various telephones are known in the art, the structure and operation of the operational circuitry 70 need not be described herein. Instead, reference is more particularly directed to the low-pass filter 72, which is the primary component of the present invention.

As is illustrated, the low-pass filter 72 is electrically interposed between the connector 68 and operational circuitry 70 for operation integrally therewith. Preferably, the low-pass filter 72 is designed to pass signals having frequency components in the POTS bandwidth, or approximately DC to approximately 3.4 kilohertz. In the preferred embodiment, the low-pass filter 72 may be designed to have an upper cutoff frequency in the range of 4 kilohertz to 10 kilohertz. Providing a slightly higher cutoff frequency may be desired for operation of the present invention in many foreign countries, since many countries are known to provide control signaling in the frequency band just above the POTS frequency band. Thus, by extending the upper cutoff frequency into a slightly higher frequency range, the telephone handset 60 constructed in accordance with the present invention is readily adapted for use in a variety of foreign countries, as well as the United States.

Figure 4A:
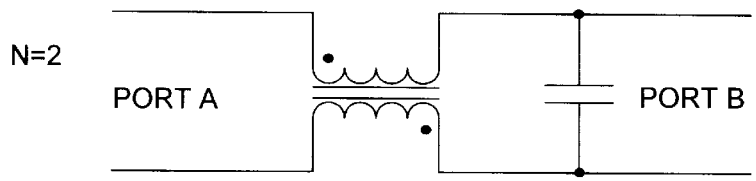
FIGS. 4A–4C are schematic diagrams illustrating alternative filter structures for implementing the low-pass filter of the present invention.
Figure 4B:
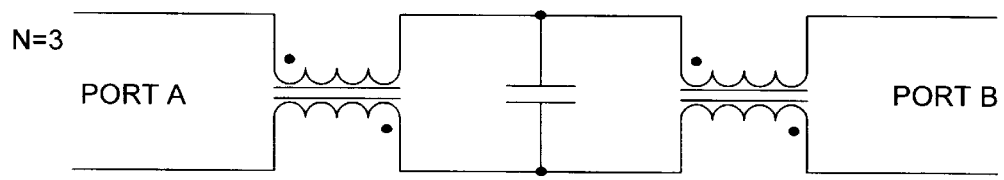
Figure 4C:
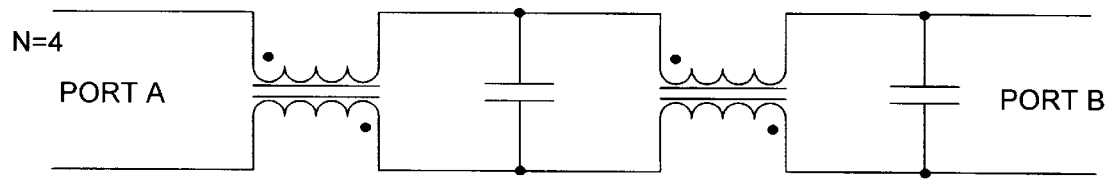

Referring briefly to FIGS. 4A through 4C, several alternative low-pass filter circuit designs are shown. Specifically FIG. 4A shows a simple second order LC filter, while FIGS. 4B and 4C illustrate third and fourth order LC filters, respectively. It will be appreciated that the filter designs illustrated in FIGS. 4A through 4C are provided merely for purposes of illustration, and are not deemed to be a limitation on the present invention. Indeed, the present invention is directed to the broader aspect of combining a low-pass, POTS filter in connection with a telephone handset, which has not heretofore been done. The specific design and implementation of the filter may vary depending upon a number of factors, including intended operational environment.

Indeed, the filter embodiments illustrated in FIGS. 4A through 4C illustrate simple LC filters. In practice, it may be desired to provide an active, as opposed to passive, filter to achieve the performance characteristics associated therewith. In this regard, the power source required to source the various components in an active filter (e.g., operational amplifiers) may be provided by a separate battery source within the telephone handset, or may be obtained from the power communicated across the local loop 24.

Figure 5A:
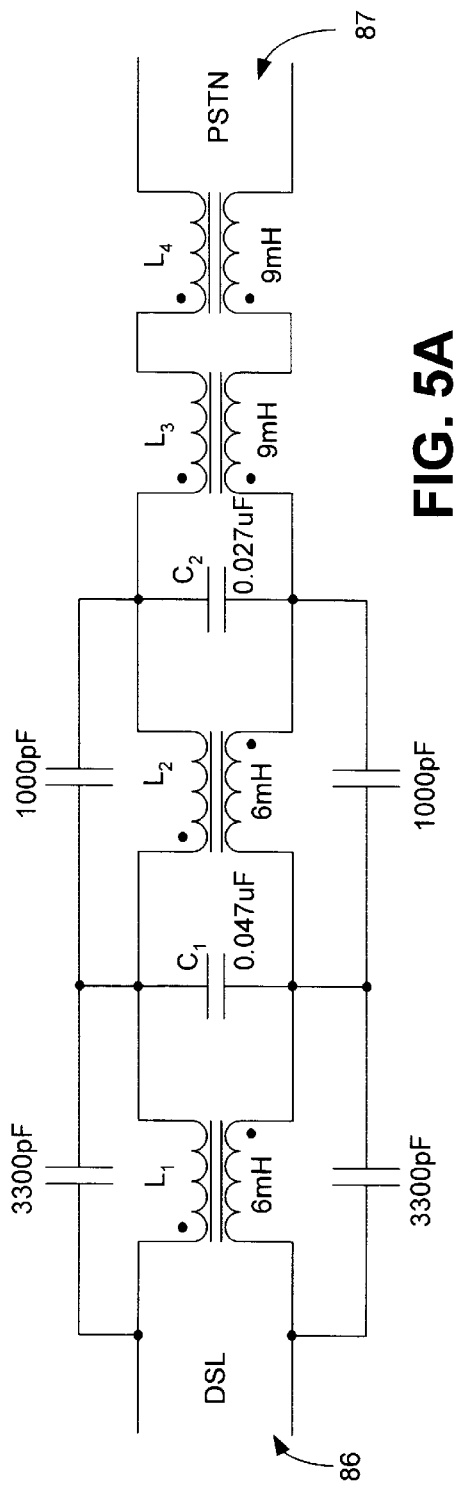
FIGS. 5A–5B are schematic diagram illustrating alternative filter circuits for realizing different input impedance values.
Figure 5B:
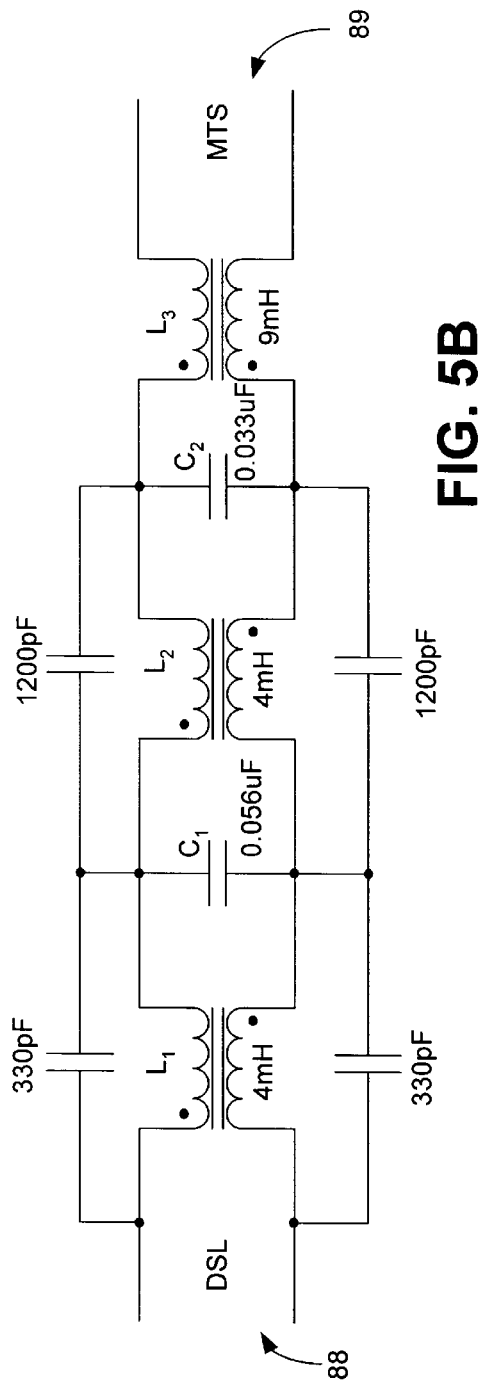

To further illustrate various differing filtering embodiments, reference is hereby made to FIGS. 5A and 5B. In this regard, FIG. 5A illustrates a particular filter having an input port 86 and an output port 87. In FIG. 5A, the various filter component values (e.g., choke values and capacitor values). FIG. 5A illustrates a balanced filter having four chokes L1, L2, L3, and L4, wherein chokes L1 and L2 have component values of six milli-henries, while chokes L3 and L4 each have component values of nine milli-henries.

Similarly, the filter of FIG. 5A has capacitors C1 and C2 having component values of 0.047 micro-farads and 0.027 micro-farads, respectively.

Significant with respect to the illustrated embodiment, the filter of FIG. 5A not only realizes a low-pass filter having an upper cutoff frequency in the desired 4 kilohertz to 10 kilohertz frequency range, but it also provides an input impedance (as seen at port 86) of approximately 600 ohms. Such filter characteristics, namely the input impedance, is preferred when the testing performed by the field service technician is performed at the customer premises (e.g., junction 62 of FIG. 2). When, however, the testing is performed at the central office (e.g., junction 66 of FIG. 2) a 900 ohm input impedance may be preferred. In this regard, reference is made briefly to FIG. 5B illustrating yet another embodiment of a filter circuit constructed in accordance with the preferred embodiment. Like the filter circuit of FIG. 5A, the circuit of FIG. 5B has in input port 88 and an output port 89. Using the component values provided in the drawing, it may be readily verified that the input impedance as seen at port 88 of the circuit of FIG. 5B is approximately 900 ohms. Thus, the circuit of FIG. 5B may be preferred when testing is performed at or near the central office 20.

Figure 3B:
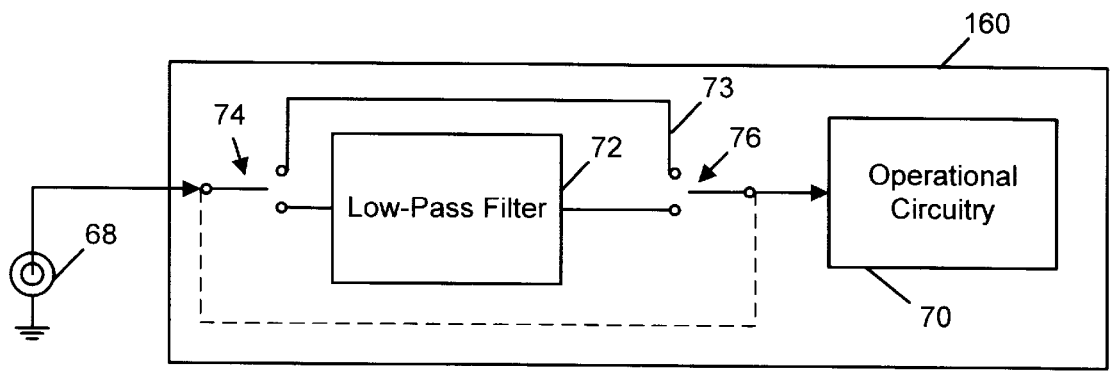
Figure 3C:
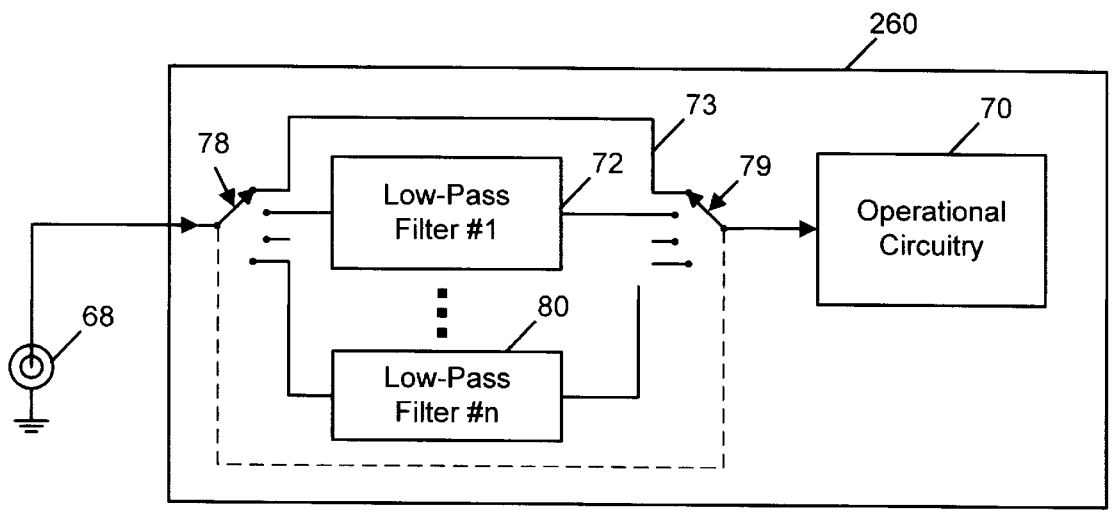

Returning now to FIG. 3, and referring specifically to FIGS. 3B and 3C, alternative embodiments of the present invention are shown. Referring first to FIG. 3B, it may be desired to provide a test telephone 160 that employs switching means, which allow the field service technician to either activate or deactivate the low-pass filter circuit of the telephone 160. In this regard, a simple double-pole double-throw manually-operated switch 74, 76 may be provided. When the wiper arms of the double-pole switch 74, 76 are disposed in a first configuration, the low-pass filter circuit 72 is switched into the circuit, so as to be electrically interposed between the connector 68 and the operational circuitry 70. When, however, the wiper arms of the double-pole switch 74, 76 are motivated to a second position, a short circuit 73 may be established to bypass the low-pass filter circuit 72, so that the connector 68 is directly connected to the operational circuitry 70.

Taking this concept one step further, consistent with the concepts in teachings of the present invention, the telephone handset 260 illustrated in FIG. 3C may be provided. The circuitry of this embodiment is similar to that of FIG. 3B, except that the circuitry of the telephone handset 260 may include a plurality of differing low-pass filter circuits 72, 80. As was discussed in connection with FIGS. 5A and 5B, it may be desired, depending upon where the test point is located, to employ testing telephones having low-pass filter circuits of differing characteristics (namely input impedance, cutoff frequencies, roll off rate, or other characteristics). In this regard, such differing low-pass filter circuits may be employed in a single telephone handset 260, and individually connectable by way of switching means to be selectively interposed between the connector 68 and the operational circuitry 70. In this regard, a manually-operated double-pole rotary switch 78, 79 may be provided to electrically connect filter circuits 1-n 72–80, between the connector 68 and operational circuitry 70. Similarly, as described in connection with FIG. 3B, a separate short circuit line 73 may also be provided, to effectively remove any low-pass filtering from the circuit interconnecting connector 68 and operational circuitry 70. In this way, a single test phone 260 may provide a rotary switch, for example, to allow a field service technician to select a low-pass filter having characteristics uniquely tailored to the environment or testing location at hand.

Figure 6A:
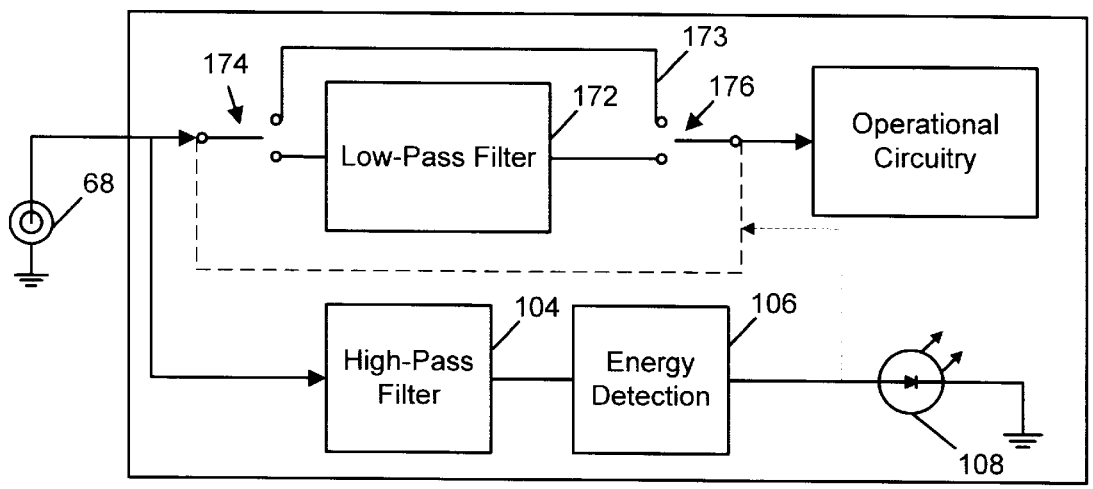
FIGS. 6A and 6B are block diagrams illustrating another feature of the present invention.

Referring now to FIG. 6A, another feature of the present invention is shown. Specifically, a line testing device constructed in accordance with the present invention may be constructed to detect the presence of an xDSL signal. Upon detection, the low-pass (or POTS) filter may be switched into the circuit. This detection feature may be provided independently, or may be provided in connection with circuitry operable to automatically switch in or out the POTS filter upon detection of an xDSL signal.

In the manner describe above in connection with FIG. 3B, a low-pass (or POTS) filter 172 may be provided, along with a bypass connection 173. When no xDSL communications are taking place, the switching means 174, 176 may be switched (either manually or automatically) to bypass the low-pass filter 172. Otherwise, when xDSL communications are occurring, then the switching means 174, 176 may be controlled to switch the low-pass filter 172 into the operative circuitry.

The detection circuitry may be provided by a high-pass filter 104 and energy detection circuitry. In this regard, the high-pass filter is designed to have a lower cutoff frequency that is higher than the upper frequency POTS band, thereby passing only xDSL signals. The energy detection circuitry 106 is designed to generate an output signal whenever an energy level (higher than a predetermined value) is detected. It will be appreciated that the high-pass filter will preferably be designed with a high input impedance, so as to have minimal impact or affect upon the line. The output of the energy detection circuitry may be directed to an LED 108 or other signaling mechanism to provide an indication (either visual or audible) that xDSL communications are occurring. This will serve as an indication to the field service technician that the low-pass filter 172 should be switched into the circuitry. The output of the energy detection circuitry may also be used as the control mechanism for the switching means 174, 176.

Figure 6B:
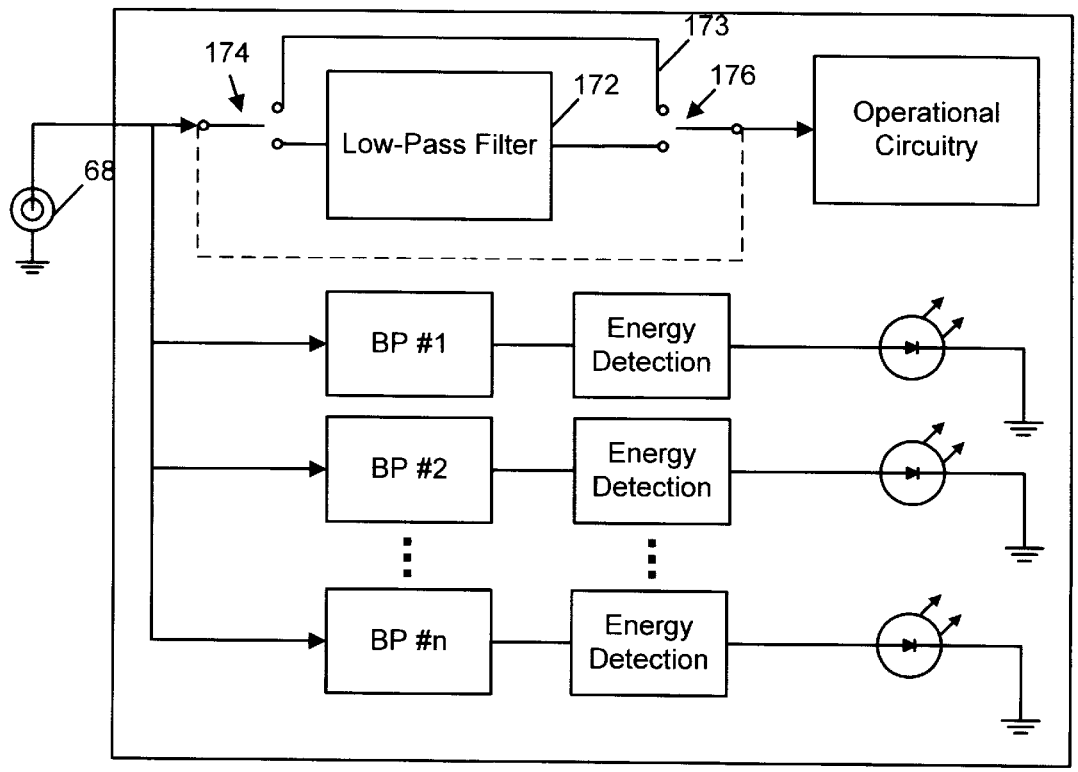

A further embodiment of the present invention is illustrated in FIG. 6B. This embodiment is similar to that of FIG.

6A, except that it includes multiple band-pass filters BP#1, BP#2, and BP#n. Energy detection circuitry is provided in connection with the output of each of the band-pass filters. This embodiment of the present invention recognizes that each of the various xDSL communication services has a slightly different frequency signature, and such services can be detected individually by evaluating the energy profile at different frequencies. It will be appreciated that the embodiment of FIG. 6B may not only be used in isolation to detect and identify different xDSL communications, but may also be used in connection with an embodiment such as that illustrated in FIG. 3C. Specifically, based upon the specific xDSL service detected, it may be desired to switch in a different low-pass filter (either manually or automatically).

It will be appreciated that FIG. 6B has been presented merely for purposes of illustrating the broader concepts of a feature of an alternative embodiment of the invention. The broader functionality of this feature may be implemented in a variety of different ways. For example, the functionality of FIG. 6B may be achieved by an embodiment similar to FIG. 6A, but with the addition of an analog to digital converter disposed at the output of the high-pass filter. The output of the analog to digital converter may be processed by a processor, such as a microprocessor or digital signal processor, to analyze the frequency components of the signal, and thus ascertain the frequency signature thereof This may be implemented, for example, by computing the Fourier Transform (e.g., computing the fast fourier transform or FFT) of the signal output from the analog to digital converter. The Fourier Transform can then be processed to evaluate the frequency components of the signal. Of course other methods of evaluating the frequency signature of the signal may be implemented in place of the FFT.

The xDSL detection and identification capability discussed above may be desired for a variety of reasons. For example, a central office may wish to police its lines to ensure that no xDSL services are provided. Suppose, for example, that a central office has leased a number of local loops to another service provider (e.g., long-distance telephone service provider), under the express contractual limitation that xDSL services are not permitted. To police such a lease agreement, the central office may connect a handset with the xDSL identification feature into a MDF (main distribution frame) at the central office. Similarly, certain local loops extending from a central office may be permitted to accommodate certain xDSL services, but limited to only certain predefined xDSL services. Accordingly, the above-described identification feature may be used to ensure that no impermissible xDSL services are being used.

While the various objects, advantages, and features of the present invention have been described herein in connection with a test phone of the type used by a field service technician, it will be appreciated that certain aspects of the present invention may also be incorporated into a telephone of the type (e.g., 26) used in a customer premises 22. As is illustrated in connection with FIG. 2, when a customer premises 22 is equipped with an xDSL service, a POTS filter may be installed to protect the various POTS equipment from the high frequency transmissions at the xDSL modem 28. Preferably, the POTS filter will be selectivly switched in and out of the circuitry as needed, base upon the presence of xDSL signals on the line. Particularly, in environments where telephones 26 are the only POTS equipment at the customer premises, using a telephone constructed in accordance with the present invention, would accordingly eliminate the need for a separately installed POTS filter 30 at the customer premises.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. An improved telephone for use in a system carrying both POTS and xDSL signal transmissions, comprising:

operational circuitry designed to provide and support operational functions of the telephone;

an input/output connector for communicating signals in a POTS frequency band between a local loop and the operational circuitry;

a plurality of low-pass filter circuits disposed for selective interconnection between the input/output connector and the operational circuitry; and switching means electrically connected to the input/output connector, each of the plurality of low-pass filter circuits, and the operational circuitry, the switching means adapted to selectively interconnect one of the plurality of low-pass filter circuits between the input/output connector and the operational circuitry.

2. The telephone as defined in claim 1, wherein the switching means includes a double-pole double-throw switch.

3. The telephone as defined in claim 1, wherein the switching means includes a multi-position double-pole rotary switch.

* * * * *